United States Patent
Carrier et al.

(10) Patent No.: US 10,021,550 B2
(45) Date of Patent: Jul. 10, 2018

(54) WIRELESS BEDDING MACHINE CONTROL SYSTEM

(71) Applicant: L&P PROPERTY MANAGEMENT COMPANY, South Gate, CA (US)

(72) Inventors: Joshua A. Carrier, Carl Junction, MO (US); John Tony Garrett, Carthage, MO (US); Scott P. Danley, Webb City, MO (US)

(73) Assignee: L&P Property Management Company, South Gate, CA (US)

( * ) Notice: Subject to any disclaimer, the term of this patent is extended or adjusted under 35 U.S.C. 154(b) by 374 days.

(21) Appl. No.: 14/703,327

(22) Filed: May 4, 2015

(65) Prior Publication Data

US 2016/0327920 A1    Nov. 10, 2016

(51) Int. Cl.
*H04W 4/80* (2018.01)
*H04W 4/00* (2018.01)

(52) U.S. Cl.
CPC ............. *H04W 4/80* (2018.02); *H04W 4/008* (2013.01)

(58) Field of Classification Search
None
See application file for complete search history.

(56) References Cited

U.S. PATENT DOCUMENTS

| | | | | |
|---|---|---|---|---|
| 6,105,520 A | * | 8/2000 | Frazer | D05B 11/00 112/117 |
| 6,556,885 B2 | * | 4/2003 | Hosel | D01G 31/00 112/155 |
| 2013/0049938 A1 | * | 2/2013 | Hooke | G08C 17/02 340/12.5 |
| 2015/0040810 A1 | * | 2/2015 | Kongo | D05B 19/08 112/470.02 |

OTHER PUBLICATIONS

International Preliminary Report on Patentability dated Nov. 16, 2017 in International Patent Application No. PCT/US2016/030511, 8 pages.

* cited by examiner

*Primary Examiner* — Dennis M Butler
(74) *Attorney, Agent, or Firm* — Shook, Hardy & Bacon LLP

(57) ABSTRACT

Systems and methods for producing bedding products by remotely directing the operation of a bedding machine are provided. Embodiments include a system and a method for wirelessly controlling a bedding machine via a remote human machine interface on a mobile device. In some embodiments, the remote human machine interface is configured to provide notifications and alerts and to receive user input to remotely facilitate the operation and maintenance of a bedding machine.

20 Claims, 7 Drawing Sheets

«WIRELESS BEDDING MACHINE CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Embodiments of the present invention relate to the manufacture of bedding products. More particularly, embodiments of the present invention relate to systems and methods for remotely controlling the operation of a bedding machine.

BACKGROUND OF THE INVENTION

Traditionally, bedding machine controls for controlling the numerous and complex components of a piece of bedding machinery have been located on a stationary control panel. Consequently, a bedding machine operator has to be physically located at the control panel to execute controls on the bedding machinery. Additionally, bedding machinery is often very large. Because of the size of the bedding machinery, the machine operator often has to leave the control panel to perform various tasks involving the machinery. For example, the machine operator has to periodically change supply rolls and splice new materials into a bedding machine. Accordingly, the operator cannot control the various functions of the machine, for example starting and stopping the machine, unless they are physically located at the control panel.

Bedding machinery can be as many as 70 feet long, or longer. Bedding machines have an infeed side and an output side. A panel cutter is located on the output side, while a materials handling package and the control panel are located on the infeed side. As a result, if a machine operator is performing a duty that requires them to be on the panel cutter side, and the machine shuts off, the operator may have to travel 70 feet or more to view the control panel and identify the issue that caused the machine to turn off. Additionally, if the operator needs to manually shut down the machine, they have to go to the control panel. This may happen, for example, in the event of a machine malfunction. As can be seen, this presents a problem, as the operator may have to travel a substantial distance to turn off the machine. Consequently, current control mechanisms for bedding machinery are inadequate in a variety of ways.

BRIEF SUMMARY OF THE INVENTION

Embodiments of the present invention generally relate to systems and methods for remotely controlling the operation of a bedding machine. In embodiments of the invention, a system for controlling a bedding machine includes a control device that is configured to control operation of the bedding machine. The control device may include a wireless human-machine interface (HMI) server and a control device wireless communication component. The system may also include a mobile device for providing a remote HMI that is capable of presenting notifications from the control device and receiving input for controlling the bedding machine.

Accordingly, in one embodiment of the invention, a control device is configured to control operation of a bedding machine. The control device comprises a control device processor; a wireless human-machine interface (HMI) server; and a control device wireless communication component, configured to send and receive control device information. In this embodiment, a mobile device is communicatively coupled to the control device and is configured to provide a HMI for interacting with the control device. The mobile device may include a mobile device wireless communication component, configured to communicate with the control device; and a user interface component configured to display a HMI and receive user input.

In another embodiment, the invention includes a remote method for controlling bedding system operation. The method includes receiving, by a mobile device having a user interface component, one or more items of human-machine interface (HMI) information by a control device wireless communication component associated with a control device; generating a remote HMI for presentation on the mobile device, the remote HMI comprising one or more features associated with the bedding machine control device. In embodiments, the method further includes presenting one or more of a plurality of notifications on the mobile device, including a material run-out notification, indicating that a material needs to be resupplied; a splicing request notification, indicating that the control device has detected that a splice is required; and a thread break notification, indicating that a thread break has been detected by the control device.

In additional embodiments, the method further includes receiving user input on the mobile device for controlling the bedding machine. More specifically, the method includes: receiving a user input on the mobile device, the received user input corresponding to a remote HMI instruction for controlling the bedding machine; and sending the remote HMI instruction to the bedding machine control device, wherein upon receipt of the remote HMI instruction by the bedding machine control device, the bedding machine control device is configured to execute the remote HMI instruction to operate the bedding machine. In illustrative embodiments, the instruction includes a stop instruction; a start instruction; a change speed instruction; and a replenish splice instruction.

Accordingly, the present invention provides several advantages over existing means of controlling bedding machinery. For example, the systems and methods described herein decrease downtime caused by the time an operator spends walking back and forth between the various parts of the machinery and a stationary control panel. Additionally, as will be described herein in detail, the systems and methods of the present invention provide substantial advantages for the maintenance and repair of bedding machines. As a result, the systems and methods herein increase machine uptime, needle time and overall throughput.

Additional objects, advantages, and novel features of the invention will be set forth in part in the description that follows, and in part will become apparent to those skilled in the art upon examination of the following, or may be learned by practice of the invention.

BRIEF DESCRIPTION OF THE DRAWINGS

Examples of the present invention are described in detail below with reference to the attached drawing figures, wherein.

DETAILED DESCRIPTION

Figure 1:
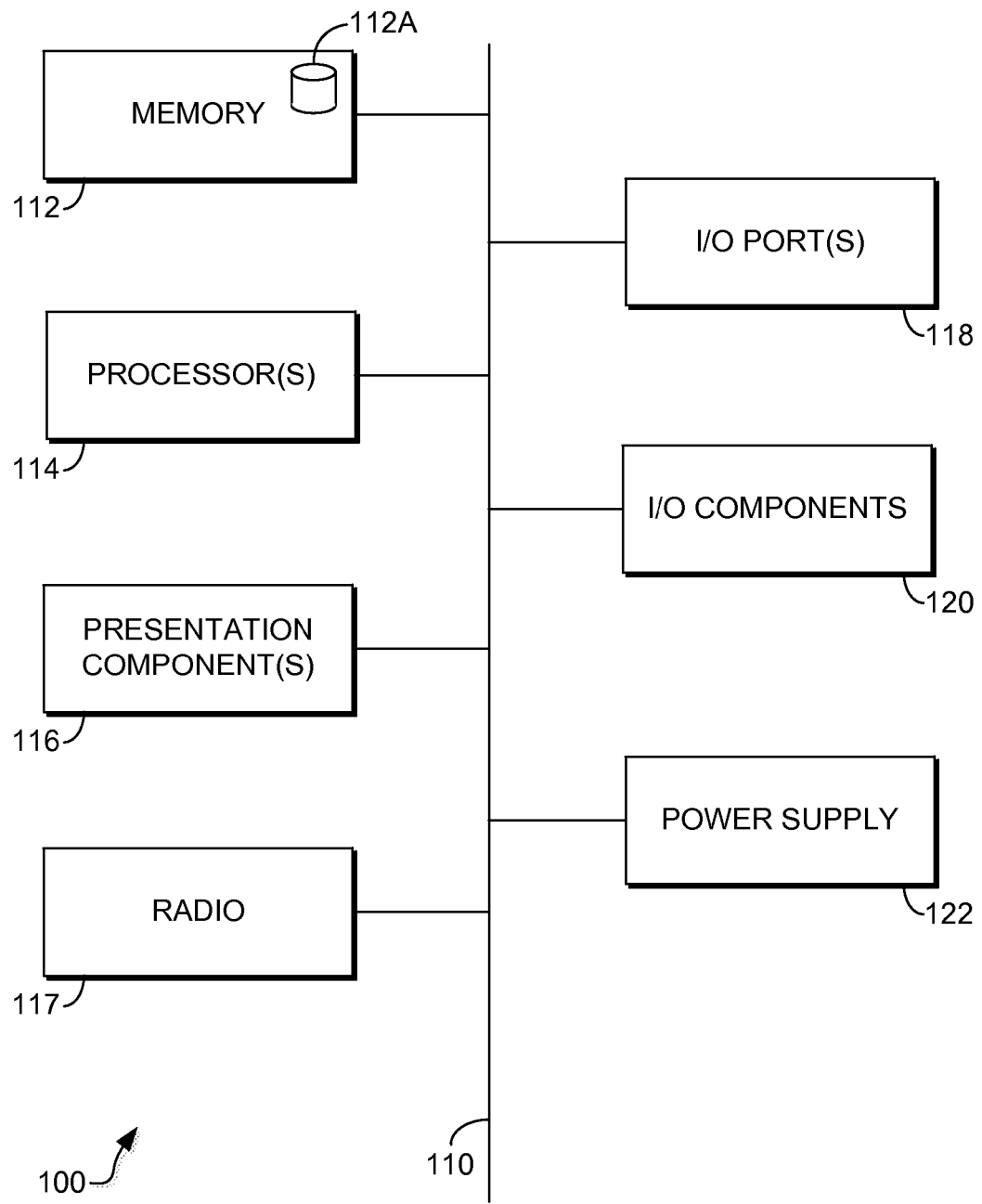
FIG. 1 illustrates an exemplary operating environment for implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Embodiments herein relate to systems and methods for remotely directing the operation of a bedding machine. Additional embodiments herein relate to using the mobile device to facilitate maintenance and manage inventory on the bedding machine.

Accordingly, in one embodiment of the invention, a remote system for controlling bedding system operation is provided. The system includes a control device configured to control operation of a bedding machine, comprising: a processor; a wireless human-machine interface (HMI) server; and a control device wireless communication component configured to send and receive control device information. The system further includes a mobile device for providing a remote HMI for interacting with the control device, the mobile device comprising: a mobile device wireless communication component configured to communicate with the control device wireless communication component; and a user interface component configured to display the remote HMI and receive user input.

In another illustrative aspect, the system provides a means for communicating received user input, received on the mobile device, to the control device. In this aspect, the control device is configured to execute an action on the bedding machine in response to a received user input communicated to the control device. The user input may correspond to one or more of a plurality of instructions, the plurality of instructions comprising: a stop instruction; a start instruction; a change speed instruction; and a replenish splice instruction. By way of example, in some instances, an operator may notice that a splice is needed. The operator can issue a replenish splice instruction, which communicates a request from the mobile device to the control device to stop operation of the bedding machine at the next convenient time. This allows the operator to issue a splice request from the materials handling package when a splice is needed, rather than having to go to the main control panel to issue the request and stop the machine. Further, the operator can restart the machine from the materials handling package once they have completed the splice, rather than having to go back to the main control panel to restart the bedding machine. As will be apparent, instructions may be sent from a variety of locations, and this example is not intended to be limiting in any way.

In a further illustrative aspect, the remote HMI of the system is configured to provide a variety of notifications on the mobile device. The notifications may comprise, for example, one or more of the following: a material run-out notification, indicating that a material needs to be resupplied; a splicing request notification, indicating that the control device has detected that a splice is required; and a thread break notification, indicating that a thread break has been detected on the bedding machine. The mobile device may also provide a variety of production statistics and maintenance records. For example, a piece count or an input and output status for a bedding machine can be received by, or stored, on the device and presented to the operator. Additionally, a maintenance history can be stored on the control device. Further, the control device may communicate maintenance notifications to the mobile device. For example, a maintenance notification may notify the operator that maintenance is required or suggested for the bedding machine, based on a tracked runtime or uptime of the bedding machine. In some aspects, the notifications are generated by the control device. Additionally, in other aspects, notifications and alerts may be generated by a device other than the control device and communicated to the mobile device.

The remote HMI is further configured to provide one or more error messages, each error message indicating that an error associated with the bedding machine has been detected. In some aspects, error messages may contain a location of the bedding machine corresponding to the error. Because the error message includes a location in the bedding machine that produced the error, the operator can go directly to the portion of the machine experiencing the error to address the problem that produced the error. Additionally, the mobile device may be configured to send and/or receive communications to a device other than the control device, such as a service technician remote device. For example, in embodiments, the error message is communicated to a service technician remote device at a remote location. The system may also be configured to communicate a real-time image to the service technician remote device, the real-time image being captured using an imaging device of the mobile device. Further, the system may be configured to provide one or more of the following on the mobile device: bedding machine diagrams, bedding machine schematics, and bedding machine maintenance instructions.

In additional aspects, one or more control device components of the control device are configured for incorporation into existing machinery, such that incorporating the one or more control device components enables control of the existing bedding machinery with the mobile device. For example, the various components described herein may be integrated or retrofitted into existing bedding machinery, thereby enabling the existing bedding machinery to communicate with the mobile device. The system may further include a downloadable mobile device application, the application including one or more instructions for generating the remote HMI for interacting with the control device.

Another embodiment of the invention provides a remote method for controlling bedding system operation. The method comprises: receiving, by a mobile device having a user interface component, one or more items of remote human-machine interface (HMI) information from a control device wireless communication component associated with a bedding machine control device, wherein the mobile device is remote from the bedding machine control device; and generating a remote HMI for presentation on the mobile device, the remote HMI comprising one or more features associated with the bedding machine control device.

In some illustrative aspects, the method further includes presenting one or more of a plurality of notifications on the mobile device. The plurality of notifications may include: a material run-out notification, indicating that a material needs to be resupplied; a splicing request notification, indicating that the control device has detected that a splice is required; and a thread break notification, indicating that a thread break has been detected by the control device. Further, the method may include generating a look ahead indication on the remote HMI of the mobile device for viewing one or more future production runs scheduled for the bedding machine and materials associated with the one or more future production runs.

In additional aspects, the method includes presenting an integrated inventory management feature on the remote HMI. The method for presenting in an integrated inventory management remote HMI comprises: generating an inventory management indicator on the remote HMI of the mobile device; receiving an indication of a material replenishment request indicating that a material is needed, wherein the indication of a material replenishment request was generated in response to the bedding machine control device detecting a need for a material during operation of the bedding machine; presenting the material replenishment request on the mobile device; presenting a selectable indicator corresponding to the material replenishment request; receiving a selection of the selectable indicator; and communicating the material replenishment request to the inventory management system. Some bedding machines are equipped with, for example, "Batch Mode." "Look Ahead" is a feature of "Batch Mode" that allows the operator to view future runs and materials that will be needed for the future runs. Advantageously, the operator can view this information on the mobile device while in a remote location. For example, the operator can view upcoming jobs and the required materials for the jobs from a storage room or inventory room. This allows the operator to send and receive information regarding bedding machine production remotely in order to obtain materials that will be needed for future runs.

In additional aspects, the method includes receiving a user input on the mobile device, the user input corresponding to a remote HMI instruction for controlling a bedding machine. The method of controlling the bedding machine upon receiving a remote HMI instruction includes: receiving a user input on the mobile device, the received user input corresponding to a remote HMI instruction for controlling the bedding machine; and sending the remote HMI instruction to the bedding machine control device, wherein upon receipt of the remote HMI instruction by the bedding machine control device, the bedding machine control device is configured to execute the remote HMI instruction to operate the bedding machine. In one aspect, the received instructions may include: a stop instruction; a start instruction; a change speed instruction; and a replenish splice instruction.

Another illustrative aspect of the method includes presenting one or more of a plurality of error messages indicating that an error associated with the bedding machine is detected and including a location of the bedding machine corresponding to the error on the mobile device. The method may further include communicating the at least one error message to a service technician at a remote location and including a location of the bedding machine corresponding to the error, on the mobile device. In one embodiment, the at least one error message may be communicated automatically to a service technician remote device, or any other device configured to receive communications from the mobile device. Further, in another embodiment, a real-time image is communicated to the service technician remote device, the real-time image being captured by an imaging device of the mobile device. Additionally, in some embodiments, instructions from the service technician remote device may be received on the mobile device. The instructions may include communicating a real-time image from the service technician remote device to the mobile device.

In other aspects, the method includes acquiring image data with the imaging device of the mobile device, and communicating the image data to the control device, or another device. In one embodiment, the method includes: acquiring image data with an imaging device of the mobile device, the image data corresponding to a scannable code representing data associated with an operation of the bedding machine; and communicating the acquired image data to the control device.

In an additional embodiment of the invention, a remote system for control of bedding machine operation is provided. The system may include a control device at a first location coupled to a bedding machine, comprising: a processor; a wireless human-machine interface (HMI) server configured to serve wireless/remote HMI information; an operating system translation server configured to translate one or more computer languages; and a control device wireless communication component configured to send and receive control device information. The system further includes a mobile device at a second location for providing a remote HMI, the mobile device comprising: a mobile device wireless communication component configured to communicate with the control device wireless communication component; and a user interface component configured to display the remote HMI and receive user input. The system may further include a remote user device at a third location configured to communicate with at least one of the control device and the mobile device. As will be appreciated, the system is configured to facilitate communication between a plurality of remote user devices, at a plurality of locations, and the control device/mobile device.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment for the bedding system control systems and methods described herein and is not intended to suggest any limitation as to the scope of use or functionality of the invention. Neither should the computing device 100 be interpreted as having any dependency or requirement relating to any one or combination of components illustrated.

Some aspects of the invention may be described in the general context of computer code or machine-useable instructions, including computer-executable instructions such as program modules, being executed by a computer or other machine, such as a tablet, smart phone, or other handheld device. Generally, program modules including routines, programs, objects, components, data structures, etc., refer to code that perform particular tasks or implement particular data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Radio 117 may be integrated in computing device 100 or in a mobile computing device (not shown). Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Mobile device, as used herein, refers to a device separate from the main control panel of a bedding machine. For example, mobile devices may include a tablet, a smart phone or a laptop. The mobile device can also be used to refer to a stationary PC located remotely from the main control panel. Although some components are shown in the singular, they may be plural. For example, computing device 100 might include multiple processors or multiple radios, etc.

Memory 112 might take the form of one or more of the aforementioned media. Thus, we will not elaborate more here, only to say that memory component 112 can include any type of medium that is capable of storing information in a manner readable by a computing device. Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors 114 that read data from various entities such as memory 112 or I/O components 120. Processor 114 might actually be multiple processors that receive instructions and process them accordingly. Presentation component 116 includes the likes of a display and a speaker, as well as other components that can present information. Presentation component(s) 116 present data indications to a user or other device. Exemplary presentation components include a display device, speaker, printing component, vibrating component, etc.

Radio 117 represents a radio that facilitates wireless communication. Illustrative wireless communications include Wi-Fi communications and near-field communications (for example, Bluetooth). Radio 117 may also facilitate communications with a telecommunications network. Telecommunications network technologies include Long Term Evolution (LTE) and Evolved Data Optimized (EVDO) and the like.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into computing device 100. Power supply 122 includes items such as batteries, fuel cells, or any other component that can act as a power source to power computing device 100.

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media does not comprise signals per se. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

I/O ports 118 allow computing device 100 to be logically coupled to other devices including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Figure 2:
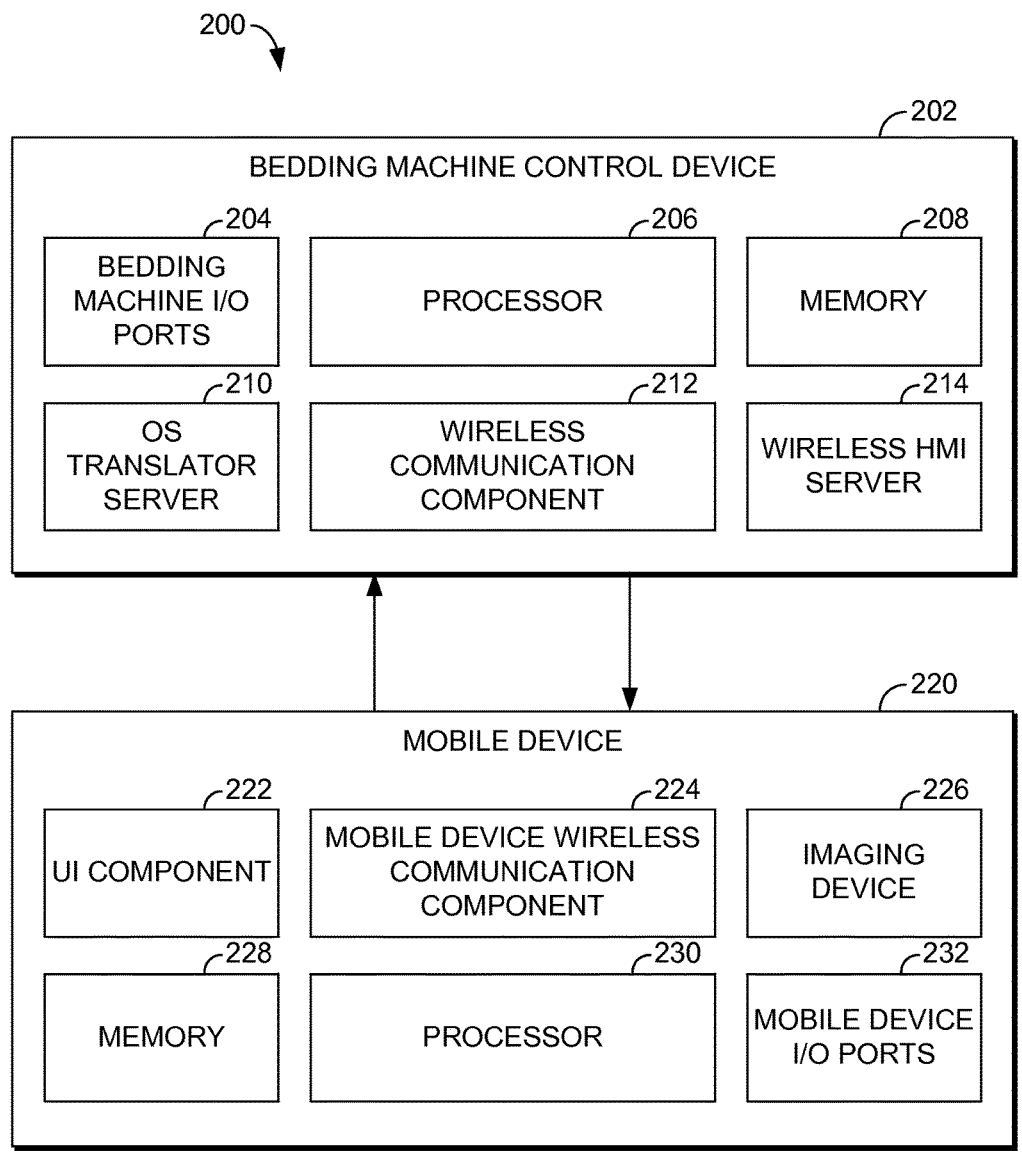
FIG. 2 illustrates a remote system for controlling bedding system operation.

Turning now to FIG. 2, a block diagram is provided illustrating an exemplary system 200 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 2, the system 200 includes a control device 202. It should be understood that the system 200 shown in FIG. 2 is an example of one system in which embodiments of the present invention may be employed. Each component shown may include one or more computing devices similar to the computing device 100 described with reference to FIG. 1. The system 200 should not be interpreted as having any dependency or requirement related to any single module/component or combination of modules/components illustrated therein. Each may comprise a single device or multiple devices cooperating in a distributed environment. For instance, the control device 202 and mobile device 220 may comprise multiple devices arranged in a distributed environment that collectively provide the functionality described herein. Additionally, other components not shown may also be included within the network environment.

FIG. 2 illustrates a remote system for controlling bedding system operation 200. The control device 202 is configured to control operation of a bedding machine (not shown). The bedding machine may be, for example, a multi-needle quilting machine. A multi-needle quilting machine uses multiple threads to quilt mattress panels for attachment to the top of mattresses. Currently, most bedding machines are controlled using a stationary main control panel. As mentioned above, a quilting machine may have an infeed side and an output side with a panel cutter where the quilted material is cut into panels. Consequently, a bedding machine operator may be performing their duties at a variety of locations at any given time, but existing systems and methods only allow for operation of the bedding machine from the main control panel. Advantageously, the systems and methods described herein allow the operator to control the bedding machine remotely.

Continuing now with FIG. 2, the control device 202 includes various components, comprising: a processor 206; a wireless human-machine interface (HMI) server 214; a control device wireless communication component 212 configured to send and receive control device information. By way of example only, the control device wireless communication component 212 may include a Wi-Fi router. The control device 202 is configured to execute an action on the bedding machine in response to a received user input communicated to the control device from the mobile device. The system further includes a mobile device 220 for presenting a remote HMI for interacting with the control device 202, the mobile device 220 comprising: a mobile device wireless communication component 224 configured to communicate with the control device wireless communication component 212; and a user interface component 222 configured to display the remote HMI and receive user input.

In some embodiments, the control device 202 also includes control device input/output ports 204 and control device memory 208. Control device 202 may further include an operating service translator server 210 for translating the computer language of the control device 202 to a computer language that is compatible with the operating system of mobile device 220. By way of example only, the operating service translator server 210 may include a representational state transfer (REST) client and a simple object access protocol (SOAP) client. The control device 202 may also include a wireless HMI server 214, configured to serve wireless/remote HMI information for use by the mobile device 220. In some embodiments, the mobile device 220 may also include an imaging device 226, a mobile device memory 228, a mobile device processor 230 and mobile device input/output ports 232.

In another illustrative aspect, the control device 202 is configured to execute an action on the bedding machine in response to a received user input communicated to the control device 202 from the mobile device 220. In this embodiment, the user input is received by the mobile device user input component 222 of the mobile device and communicated by the mobile device wireless communication component 224. Additionally, the user input is received by the control device wireless communication component 212 of the control device 202. The user input may correspond to one or more of a plurality of instructions, including: a stop instruction; a start instruction; a change speed instruction; and a replenish splice instruction.

In a further illustrative aspect, the remote HMI of the system is configured to provide one or more of a plurality of notifications on the mobile device 220. The one or more notifications may be generated by the control device 202. The one or more notifications may comprise: a material run-out notification, indicating that a material needs to be resupplied; a splicing request notification providing an indication that the control device 202 has detected that a splice is required; and a thread break notification providing an indication that a thread break has been detected on the bedding machine. In one embodiment, the control device 202 receives an indication from the bedding machine via the control device input/output ports 204. The indication may be processed, for example using processor 206 and translated to a computer language of the mobile device 220 by the operating system translator server 210. Additionally, in some embodiments, the indication is formatted for communication to the mobile device 220 by the wireless HMI server 214. Further, the indication may be communicated by the control device wireless communication component 212 to the mobile device 220. The mobile device 220 may receive the notification via the mobile device wireless communication component 224. Further, the notification may be processed by the mobile device processor 230 and presented as a remote HMI by the user interface component 222 of the mobile device 220.

The mobile device remote HMI is further configured to provide one or more of a plurality of error messages, each error message indicating that an error associated with the bedding machine has been detected and including a location of the bedding machine corresponding to the error. Error messages are communicated from the control device 202 to the mobile device 220 using similar components as described hereinabove with reference to providing notifications on the mobile device 220. Further, in embodiments, the error message may be communicated to a service technician remote device. The mobile device may additionally be configured to communicate a real-time image to the service technician remote device, the real-time image being captured using the imaging device 226 of the mobile device 220. The mobile device may be further configured to present one or more of the following on the mobile device 220: bedding machine diagrams, bedding machine schematics, and bedding machine maintenance instructions. Communicating the error messages and the real-time images may be facilitated, for example, using the mobile device wireless communication component 224 and/or the control device wireless communication component 212. The error message and the real-time image may be communicated automatically or upon receipt of user input corresponding to an instruction to send the error message and/or the real-time image.

In additional aspects, the control device 202 features are configured for incorporation into existing machinery, such that incorporating the one or more features enables control of the existing bedding machinery with the mobile device 220. For example, the operating system translator server 210, the control device wireless communication component 212, and the wireless HMI server 214 may be incorporated into an existing control device, such that the control device can communicate with the mobile device 220. The system may further include a downloadable mobile device application, including one or more instructions for generating the remote HMI for interacting with the control device 202. The downloadable mobile device application may be downloaded on the mobile device 220 and stored, for example, on the mobile device memory 228. As such, a variety of mobile devices can be used for presenting the remote HMI for interacting with the control device 202.

Figure 3:
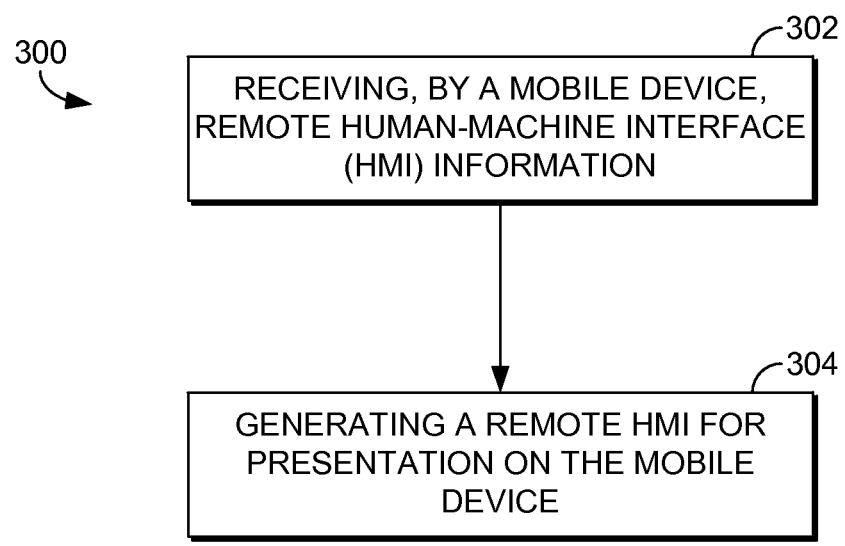
FIG. 3 is a flow diagram of an exemplary remote method for controlling bedding system operation.

FIG. 3 is a flow diagram of an exemplary method 300 for producing bedding products by remotely directing the operation of a bedding machine. At block 302, one or more items of remote human-machine interface (HMI) information is received by a mobile device having a user interface component from a bedding machine control device wireless communication component associated with a bedding machine control device, wherein the mobile device is remote from the bedding machine control device. At block 304, a remote HMI is presented on the mobile device.

Figure 4:
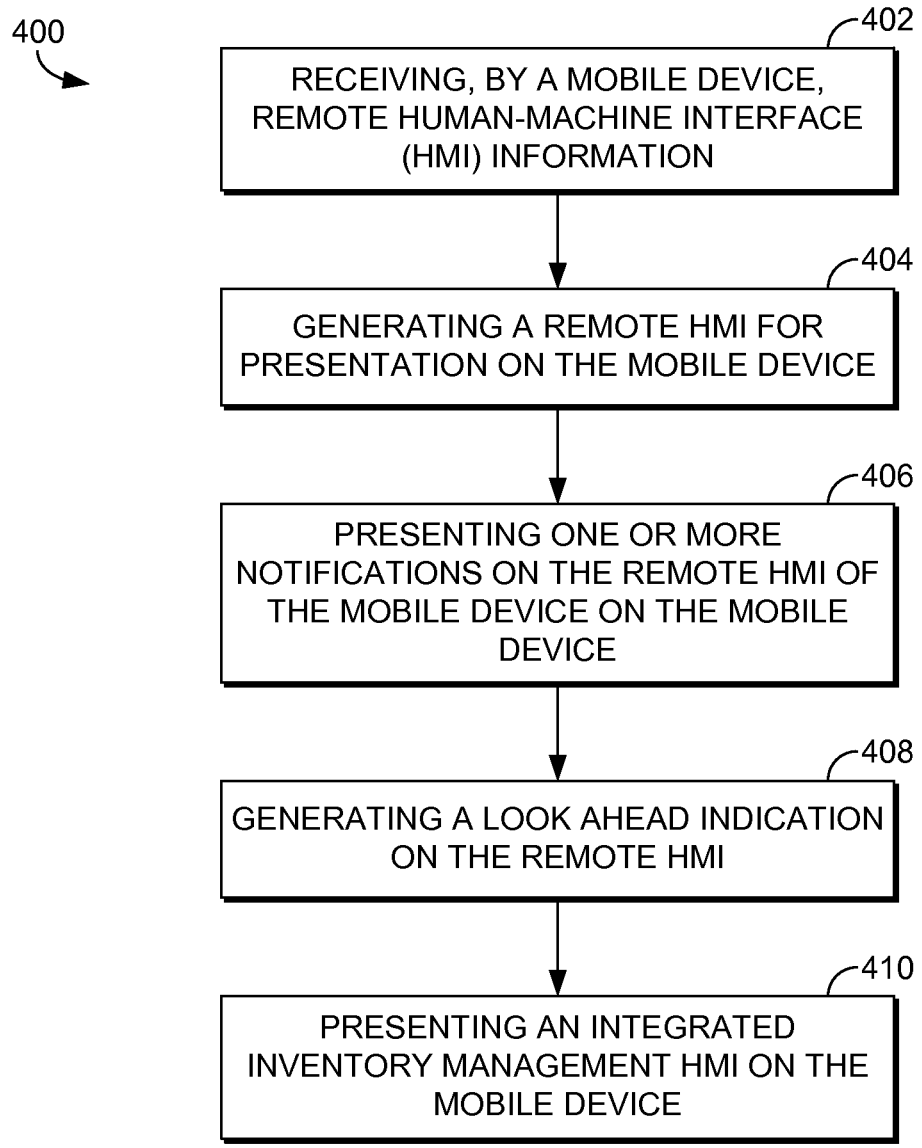
FIG. 4 is a flow diagram further illustrating the remote method for controlling bedding system operation, wherein notifications are presented on a remote HMI of a mobile device.

FIG. 4 is a flow diagram further illustrating the remote method for controlling bedding system operation, wherein notifications are presented on a remote HMI of a mobile device. At block 402, one or more items of remote human-machine interface (HMI) information is received by a mobile device having a user interface component from a bedding machine control device wireless communication component associated with a bedding machine control device, wherein the mobile device is remote from the bedding machine control device. At block 404, a remote HMI is generated on the mobile device, the remote HMI being generated, at least in part, using the remote HMI information from the bedding machine control device. At block 406, one or more notifications from the bedding machine control device are presented on the mobile device. The plurality of notifications may include: a material run-out notification, indicating that a material needs to be resupplied; a splicing request notification, indicating that the bedding machine control device has detected that a splice is required; and a thread break notification, indicating that a thread break has been detected by the bedding machine control device. At block 408, a look ahead remote HMI indication is presented on the mobile device for viewing one or more of the future runs scheduled for the bedding machine and the materials scheduled for production on the bedding machine. At block 410, an inventory management remote HMI indicator is generated and presented on the mobile device. The method for presenting in an integrated inventory management remote HMI may comprise: generating an inventory management indicator on the remote HMI of the mobile device; receiving an indication of a material replenishment request indicating that a material is needed, wherein the indication of a material replenishment request was generated in response to the bedding machine control device detecting a need for a material during operation of the bedding machine; presenting the material replenishment request on the mobile device; presenting a selectable indicator corresponding to the material replenishment request; receiving a selection of the selectable indicator; and communicating the material replenishment request to the inventory management system.

Figure 5:
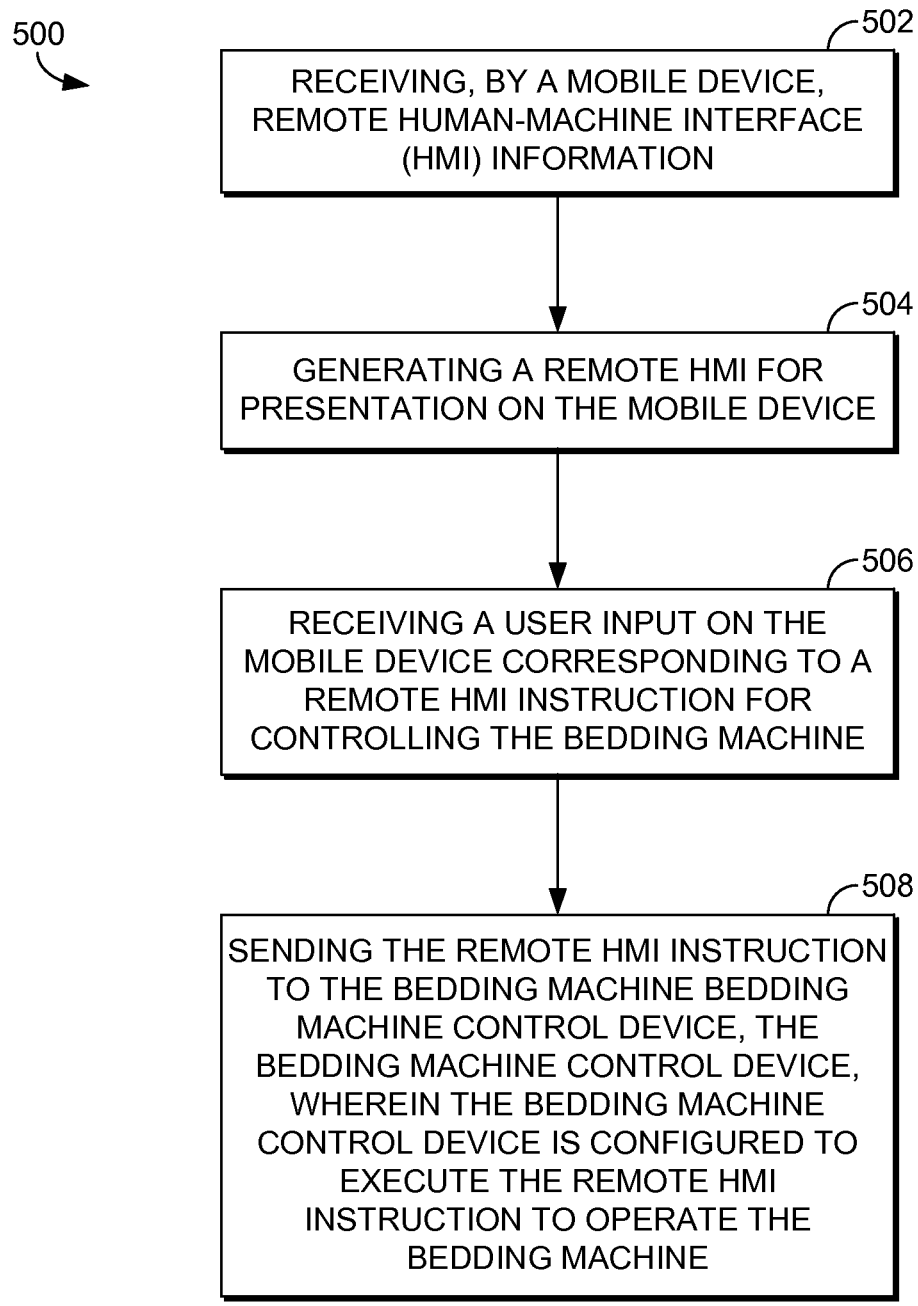
FIG. 5 is a flow diagram further illustrating the remote method for controlling bedding system operation, wherein user input corresponding to a remote HMI instruction for controlling a bedding machine is received.

FIG. 5 is a flow diagram further illustrating the remote method for controlling bedding system operation, wherein user input corresponding to a remote HMI instruction for controlling a bedding machine is received. At block 502, a mobile device receives the HMI information. At block 504, a remote HMI is generated on the mobile device. At block 506, a user input is received on the mobile device, the user input corresponding to an instruction for controlling the bedding machine. At block 508, the remote HMI instruction is sent to the bedding machine control device, wherein upon receipt of the remote HMI instruction by the bedding machine control device, the bedding machine control device is configured to execute the remote HMI instruction to operate the bedding machine. The instructions may comprise, for example: a stop instruction; a start instruction; a change speed instruction; and a replenish splice instruction.

Figure 6:
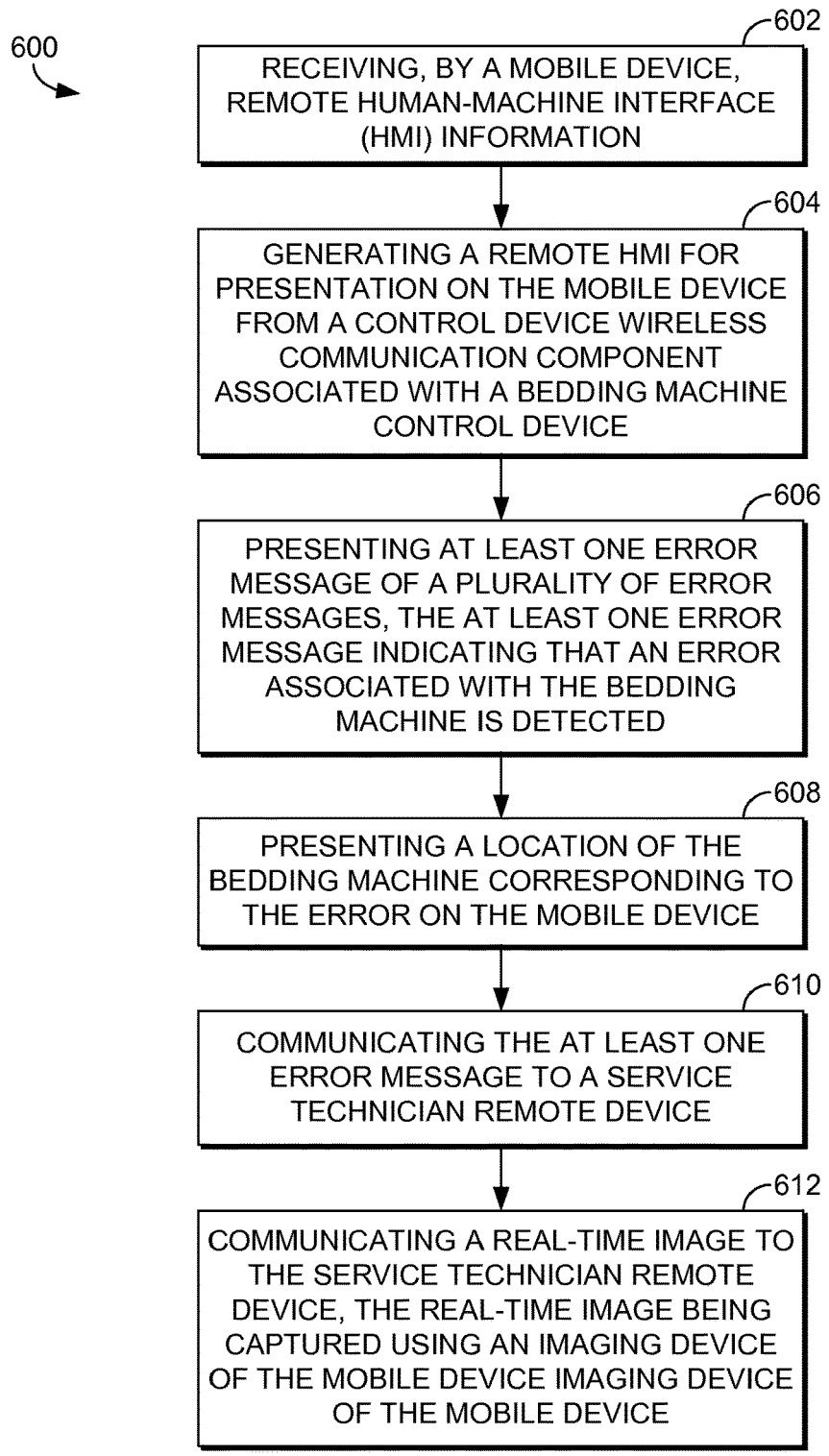
FIG. 6 is a flow diagram further illustrating the remote method for controlling bedding system operation, wherein at least one error message is provided on the mobile device.

FIG. 6 is a flow diagram further illustrating the remote method for controlling bedding system operation, wherein at least one error message is provided on the mobile device. At block 602, a mobile device receives the HMI information. At block 604, a remote HMI is generated on the mobile device. At block 606, at least one error message of a plurality of error messages is presented on the mobile device, the at least one error message indicating that an error associated with the bedding machine is detected. The method may further include additional steps, shown at blocks 608-612. At block 608, a location of the bedding machine corresponding to the error message is presented on the mobile device. At block 610, the at least one error message is communicated to a service technician remote device. In one embodiment, the at least one error message may be communicated automatically to the service technician remote device, or any other device configured to receive communications from the mobile device. At block 612, a real-time image is communicated to the service technician remote device, the real-time image being captured by the imaging device of the mobile device. Additionally, in some embodiments, instructions from the service technician remote device may be received on the mobile device. The instructions may include communicating a real-time image from the service technician remote device to the mobile device.

Figure 7:
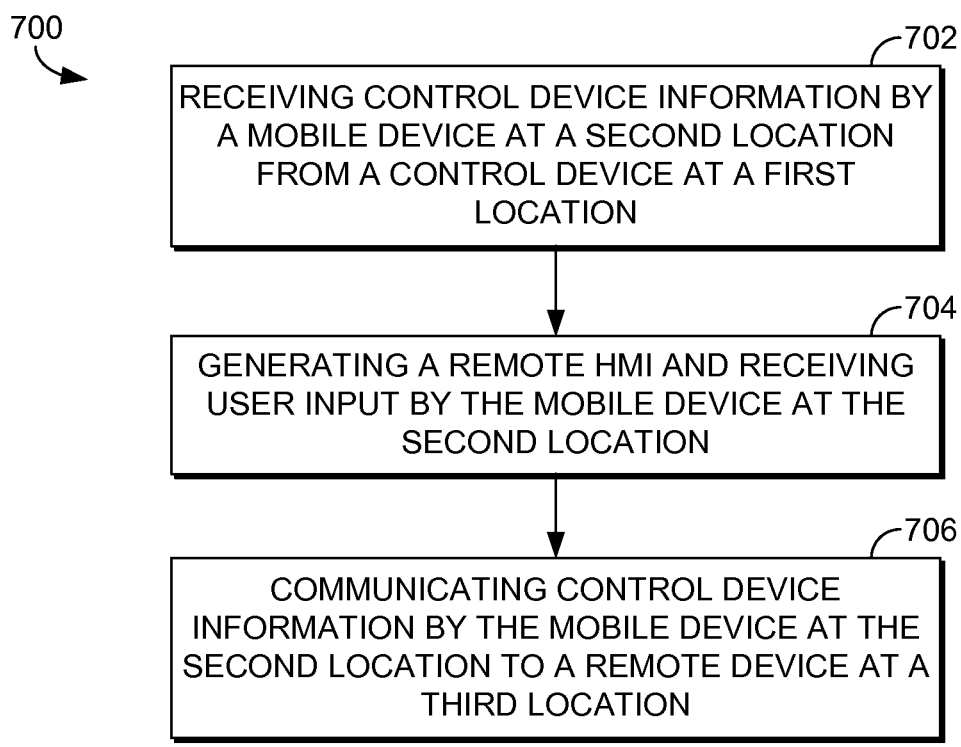
FIG. 7 is a flow diagram illustrating a method for receiving control device information at a second location from a control device at a first location in generating a remote HMI by the mobile device, wherein control device information may be communicated by the mobile device at the second location to a remote device and a third location.

FIG. 7 is a flow diagram illustrating a method for receiving control device information at a second location from a control device at a first location in generating a remote HMI by the mobile device, wherein control device information may be communicated by the mobile device at the second location to a remote device and a third location. At block 702, the method includes receiving one or more items of remote human-machine interface (HMI) information from a control device wireless communication component at a first location associated with a bedding machine control device, by a mobile device having a user interface component at a second location. At block 704 the method includes generating a remote HMI for presentation on the mobile device, the remote HMI comprising one or more features associated with the bedding machine control device. The method may further include communicating bedding machine control information to a remote user device at a third location, as shown at block 706.

The systems and methods described hereinabove may also include various other features and functionalities. For example, advantageously, one mobile device can be used to communicate with and control multiple bedding machines. Additionally, multiple mobile devices can be used to control a single bedding machine. For example, if one mobile device needs to have a battery charged, another mobile device can be used to control the bedding machine. Further, multiple devices may be in communication with the same bedding machine at the same time. This allows multiple operators to control a single bedding machine.

Additionally, the mobile device may include a magnet, such that when the device is placed on the surface of a ferromagnetic material, the mobile device will be held in place. The magnet may be included in the device itself, or in a protective case surrounding the device. In practice, this allows the mobile device to be attached to the bedding machine while the operator or maintenance personnel are performing a variety of tasks. For example, the mobile device can be magnetically attached to a surface of the bedding machine that is proximate an area of the bedding machine that is being repaired. Continuing with this example, maintenance instructions or schematics may be displayed on the mobile device at the location of the machine that is being maintained.

Systems and methods herein may also employ wireless charging to charge the mobile device. Wireless charging may be employed using a wireless charging system with a charging pad or a dock, on which the mobile device may be placed for charging. The charging pad may be located at various locations within a production environment. For example, the charging pad may be located at a control device main panel or at an operator workstation.

Since many possible embodiments may be made of the invention without departing from the scope thereof, it is to be understood that all matter herein set forth or shown in the accompanying drawings is to be interpreted as illustrative and not in a limiting sense From the foregoing, it will be seen that this invention is one well adapted to attain all the ends and objects hereinabove set forth together with other advantages, which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A system for controlling a bedding machine operation, the system comprising:
   a control device communicatively coupled to a bedding machine having an infeed side, an output side, and a cutter, wherein the control device controls a bedding machine operation, wherein the control device identifies a bedding machine operation error including at least one of a material run-out, a splice requirement, and a thread break in the bedding machine, the control device comprising:
   a processor;
   a wireless human-machine interface (HMI) server; and
   a control device wireless communication component configured to send and receive control device information;
   a mobile device for providing a remote HMI for controlling the bedding machine operation by interacting with the control device, the mobile device comprising:
   a mobile device wireless communication component configured to communicate with the control device wireless communication component; and
   a user interface component configured to display the remote HMI and receive user input.

2. The system of claim 1, wherein the control device executes an action on the bedding machine in response to a received user input communicated to the control device from the mobile device.

3. The system of claim 2, wherein the received user input corresponds to one or more instructions from a plurality of instructions, the plurality of instructions comprising:
   a stop instruction;
   a start instruction;
   a change speed instruction; and
   a replenish splice instruction.

4. The system of claim 1, wherein the remote HMI provides one or more notifications on the mobile device, and wherein the one or more notifications are generated by the control device, the one or more notifications comprising one or more of the following:
   a material run-out notification providing an indication that a material needs to be resupplied;
   a splicing request notification providing an indication that the control device has detected that a splice is required; and
   a thread break notification providing an indication that a thread break is detected on the bedding machine.

5. The system of claim 1, wherein the remote HMI provides one or more error messages generated by the control device, each of the one or more error messages indicating that the bedding machine operation error associated with the bedding machine has been detected and including a location of the bedding machine corresponding to the error.

6. The system of claim 5, wherein the remote HMI further provides one or more of the following on the mobile device:
   one or more bedding machine diagrams;
   one or more bedding machine schematics; and
   one or more bedding machine maintenance instructions.

7. The system of claim 1, wherein the mobile device communicates at least one of a received one or more error messages and a real-time image, the real-time image being captured using an imaging device of the mobile device, to a service technician remote device.

8. The system of claim 1, wherein one or more features of the control device are incorporated into existing bedding machinery such that incorporating the one or more features enables control of the existing bedding machinery with the mobile device.

9. The system of claim 1, further comprising a downloadable mobile device application, the application including one or more instructions for generating the remote HMI for interacting with the control device.

10. A method for controlling a bedding operation, the method comprising:
   identifying, by a bedding machine control device, a bedding machine operation error associated with a bedding machine having an infeed side, an output side, and a cutter, the bedding machine operation error including at least one of a material run-out, a splice requirement, and a thread break;
   receiving, by a mobile device having a user interface component, one or more items of remote human-machine interface (HMI) information associated with the bedding machine operation error from a control device wireless communication component communicatively coupled with the bedding machine control device, wherein the mobile device is remote from the bedding machine control device; and
   generating a remote HMI for controlling the bedding machine through the mobile device, the remote HMI comprising one or more features associated with the bedding machine control device.

11. The method of claim 10, further comprising presenting one or more notifications on the remote HMI of the mobile device, the one or more notifications comprising one or more of the following:
   a material run-out notification, indicating that a material needs to be resupplied;
   a splicing request notification, indicating that the bedding machine control device has detected that a splice is required; and
   a thread break notification, indicating that a thread break has been detected by the bedding machine control device.

12. The method of claim 10, further comprising generating a look ahead indication on the remote HMI of the mobile device for viewing one or more future production runs scheduled for the bedding machine and materials associated with the one or more future production runs.

13. The method of claim 10, further comprising:
   receiving a user input on the mobile device, the received user input corresponding to a remote HMI instruction for controlling the bedding machine; and
   sending the remote HMI instruction to the bedding machine control device, wherein upon receipt of the remote HMI instruction by the bedding machine control device, the bedding machine control device is configured to execute the remote HMI instruction to operate the bedding machine.

14. The method of claim 13, wherein the received user input corresponds to one or more instructions of a plurality of instructions, the plurality of instructions comprising:
   a stop instruction;
   a start instruction;
   a change speed instruction; and
   a replenish splice instruction.

15. The method of claim 10, further comprising:
   generating an inventory management indicator on the remote HMI of the mobile device;
   receiving an indication of a material replenishment request indicating that a material is needed, wherein the indication of a material replenishment request was generated in response to the bedding machine control device detecting a need for a material during operation of the bedding machine;
   presenting the material replenishment request on the mobile device;
   presenting a selectable indicator corresponding to the material replenishment request;
   receiving a selection of the selectable indicator; and
   communicating the material replenishment request to the inventory management system.

16. The method of claim 10, further comprising presenting at least one error message of a plurality of error messages, the at least one error message indicating that an error associated with the bedding machine is detected.

17. The method of claim 16, further comprising at least one of the following:
   presenting a location of the bedding machine corresponding to the at least one error message on the mobile device;
   communicating the at least one error message to a service technician at a remote location; and
   communicating a real-time image to the service technician, the real-time image being captured using an imaging device of the mobile device.

18. The method of claim 10, further comprising:
   acquiring image data with an imaging device of the mobile device, the image data corresponding to a scannable code representing data associated with an operation of the bedding machine; and
   communicating the acquired image data to the control device.

19. A system for controlling a bedding machine operation, the system comprising:
   a control device at a first location communicatively coupled to a bedding machine having an infeed side, an output side, and a cutter, wherein the control device identifies a bedding machine operation error in a first computer language, the control device comprising:
      a processor;
      a wireless human-machine interface (HMI) server configured to serve remote HMI information;
      an operating system translation server that translates one or more computer languages, wherein the operating system translation server translates the bedding machine operation error from the first computer language to a second computer language; and
      a control device wireless communication component configured to send and receive control device information;
   a mobile device at a second location for providing a remote HMI, the mobile device comprising:
      a mobile device wireless communication component that communicates the bedding machine operation error with the control device wireless communication component; and
      a user interface component configured to display the remote HMI and receive user input.

20. The system of claim 19, further comprising a remote user device at a third location configured to communicate with at least one of the control device and the mobile device.

* * * * *